United States Patent [19]

Huang et al.

[11] Patent Number: 4,649,447
[45] Date of Patent: Mar. 10, 1987

[54] COMBED MR SENSOR

[75] Inventors: Shiezen Huang, San Jose; Otto Voegeli, Morgan Hill, both of Calif.

[73] Assignee: International Business Machines, Armonk, N.Y.

[21] Appl. No.: 765,999

[22] Filed: Aug. 15, 1985

[51] Int. Cl.$^4$ .............................................. G11B 5/127
[52] U.S. Cl. ................... 360/113; 338/32 R; 324/252
[58] Field of Search ............... 360/113, 115, 125; 338/32 R; 324/252

[56] References Cited

U.S. PATENT DOCUMENTS

| | | | |
|---|---|---|---|
| 3,731,007 | 5/1973 | Masuda et al. | 360/113 |
| 3,813,692 | 10/1972 | Brock et al. | 360/113 |
| 3,840,898 | 12/1972 | Bajorek et al. | 360/113 |
| 3,845,503 | 10/1974 | Kanai | 360/115 |
| 3,864,751 | 10/1973 | Beaulieu et al. | 360/113 |
| 4,047,236 | 9/1977 | Lee | 360/113 |
| 4,103,315 | 6/1977 | Hempstead et al. | 360/110 |
| 4,280,158 | 11/1979 | Niet | 360/113 |
| 4,300,177 | 11/1981 | Koel et al. | 360/113 |
| 4,343,026 | 8/1982 | Griffith et al. | 360/113 |
| 4,418,372 | 7/1980 | Hayashida et al. | 360/113 |
| 4,477,794 | 10/1984 | Nomura et al. | 360/113 X |

FOREIGN PATENT DOCUMENTS

| 0045619 | 3/1983 | Japan | 360/113 |
|---|---|---|---|
| 0036320 | 2/1984 | Japan | 360/113 |

Primary Examiner—Robert S. Tupper
Assistant Examiner—Andrew L. Sniezek
Attorney, Agent, or Firm—Otto Schmid, Jr.

[57] ABSTRACT

A magnetic head assembly includes a magnetoresistive (MR) element for reading magnetically recorded information from a record medium. The MR element comprises an elongated member having a predetermined height and a plurality of elongated attachments which are contiguous with and made of the same material as the MR element. The elongated attachments have a predetermined width and a predetermined spacing and the attachments are unidirectionally magnetized along their length so that a bias is produced to maintain the MR sensor in a single domain state and to obtain a substantially linear component in the MR response in the MR element so that Barkhausen noise is suppressed and so that previously recorded information is read from the medium with optimum sensitivity.

7 Claims, 7 Drawing Figures

COMBED MR SENSOR

BACKGROUND OF THE INVENTION

1. Field of the Invention

This invention relates in general to magnetic transducers for transferring information signals to and from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. The MR sensor operates on the principle that the resistance of the read element is a function of the amount and direction of magnetic flux being sensed by the element.

The prior art also teaches that in order for an MR element to operate optimally, two bias fields should be provided, a first bias field along its transverse direction as well as a second bias field along its longitudinal direction. The transverse bias orients the magnetization at some skew angle relative to the sense current, as is necessary to obtain a linear component of response to the flux field in the otherwise quadratic response. This bias field is normal to the plane of the magnetic media and parallel to the surface of the planar MR element. The longitudinal bias has the purpose of inducing a single domain state of magnetization, as is required for the suppression of Barkhausen noise. The longitudinal bias field extends parallel to the surface of the magnetic media and parallel to the lengthwise direction of the MR sensor.

One type of bias method disclosed in the prior art is current induced bias in which a parallel auxiliary current produces a transverse bias field on the MR sensor strip. U.S. Pat. No. 3,813,692 shows one example of this bias method. Alternatively, the field from the sense current magnetizes a proximate soft magnetic "keeper film" whose stray field, in turn, exerts a transverse bias upon the MR sensor as is described in U.S. Pat. No. 3,864,751.

Another type of bias method is current deflection bias, as shown in U.S. Pat. No. 4,280,158. Here, the quiescent magnetization remains along the longitudinal direction, while, instead, the sense current is deflected to flow askew to the magnetization. This effect is achieved with a superpositioned "barberpole" conductor configuration. This method produces a transverse bias condition along with a small (typically insufficient) longitudinal bias field underneath the conductor.

A further type of prior art bias method comprises permanent magnet bias in which the bias condition is produced with a proximate hard magnetic film. The hard magnetic film may be ferromagnetic and coupled magnetostatically to the sensor as shown in U.S. Pat. No. 3,840,898. Alternatively, the film may be antiferromagnetic and coupled to the sensor via an exchange mechanism as shown in U.S. Pat. No. 4,103,315. Either method can, at least in principle, provide a transverse and/or a longitudinal bias component.

U.S. Pat. No. 4,418,372 discloses a magnetic rotary encoder comprising a substrate having a surface opposite to a rotary body having plural pieces of magnetic information recorded on at least one circumferentially running track. The substrate has a magnetoresistive element formed on its surface having a pattern including at least two portions extending in the radial direction of the rotary body and connected at the ends by a circumferentially extending portion. The disclosed arrangement is not designed to produce a bias in the MR element, but to produce an additive signal from each of the portions in the radial direction and phasing produced by the circumferential portions.

The prior art bias methods have been effective to meet prior art requirements, but the additional structure required adds complexity to the MR read transducer which it is desirable to avoid. The prior art does not disclose a bias method to provide transverse as well as longitudinal bias solely through the use of a particular MR sensor geometry.

SUMMARY OF THE INVENTION

It is the principal object of this invention to provide transverse as well as longitudinal bias solely through the use of a particular sensor geometry.

In accordance with the invention, a magnetic head assembly includes a magnetoresistive (MR) element for reading magnetically recorded information from a record medium. The MR element comprises an elongated member having a predetermined height measured in a direction normal to the magnetic medium from a first edge of the MR element which is adapted to face the recording medium. The MR element has a plurality of elongated attachments which are contiguous with and made of the same material as the MR element. The elongated attachments have a predetermined width and a predetermined spacing and the attachments are unidirectionally magnetized along their length so that a bias is produced to maintain the MR sensor in a single domain state and to obtain a substantially linear component in MR response in said MR element so that previously recorded information is read from said medium with optimum sensitivity, and so that Berkhausen noise is suppressed.

In a specific embodiment, a plurality of elongated attachments extend in the direction of the edge of the MR element which is adapted to face the magnetic medium and a plurality of elongated attachments extend in the direction normal to the edge of the MR element which is away from the magnetic medium.

In an alternate embodiment, an exchange bias film, patterned to the same geometry as the MR element, and the MR element are sandwiched together. The resultant combined bias improves the bias profile.

DESCRIPTION OF THE PREFERRED EMBODIMENTS

Figure 1:
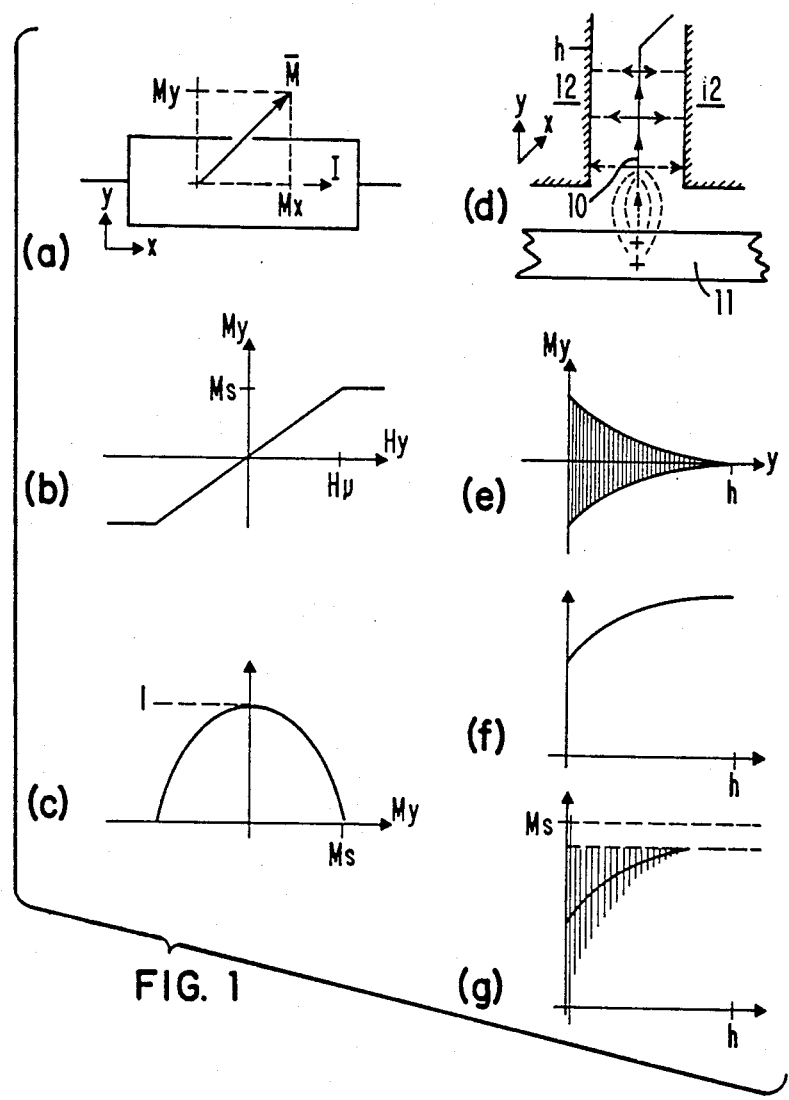
FIGS. 1(a)-(g) are sketches which show how transverse bias works for a magnetoresistive (MR) sensor.
Figure 2:
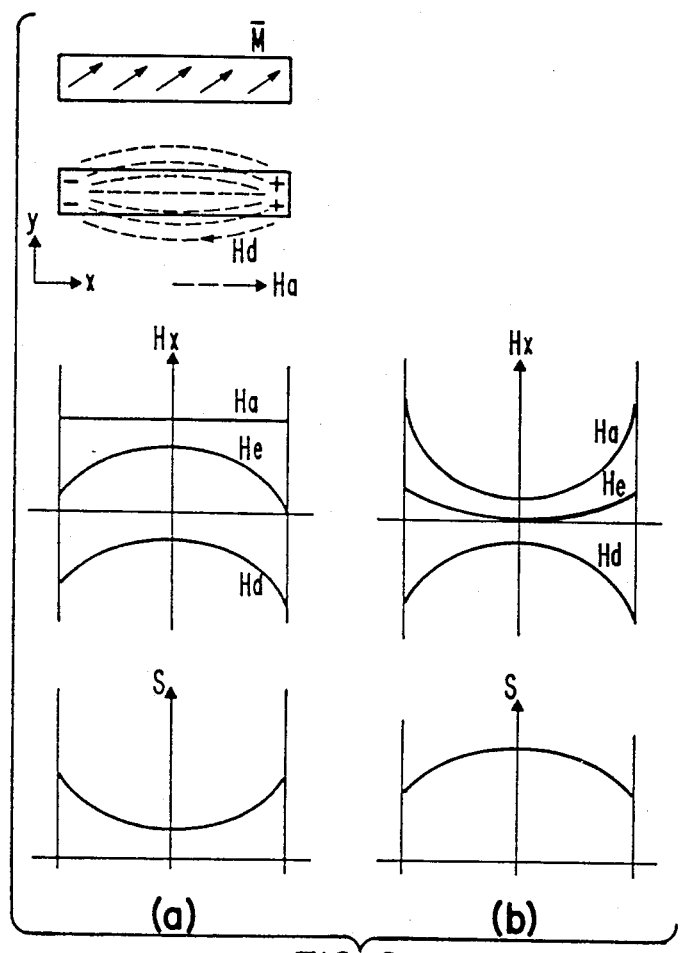
FIGS. 2(a) and 2(b) show how longitudinal bias works for an MR sensor.

To provide a better understanding of the magnetoresistive (MR) sensor according to the invention, some of the operating principles of an MR sensor will be reviewed with the aid of FIGS. 1 and 2.

The MR sensor according to the invention is provided with transverse as well as longitudinal bias, and the resulting bias profile is such as to render the sensor with optimal sensitivity and side-reading characteristics. The desired shape of the bias profile, will be described with the aid of FIG. 1 relative to the transverse bias profile and with the aid of FIG. 2 with respect to the longitudinal bias profile.

FIG. 1(a) is a sketch showing the quiescent magnetization, M, at some skew angle relative to the sense current, I, through the MR sensor 10. The plot of FIG. 1(b) shows that the transverse magnetization, My, varies linearly with bias strength, Hy, when $Hy < Hu$, where Hu is the total anisotropy (induced + shape) of the MR sensor. When $Hy \geq Hu$, then $My = Ms$ and the MR sensor is saturated.

The relationship between the resistance R of the MR sensor and the transverse magnetization My is given by $$\frac{\Delta R}{c_{mr}R} = \left[1 - \left(\frac{My}{Ms}\right)^2\right]$$

$c_{mr}$ is the Magnetoresistance coefficient which depends on the material used, and this constant is typically 2 to $3 \times 10^{-2}$ for permalloy, for example. The plot shown in FIG. 1(c) shows that the sensor's resistive signal, $\Delta R/R$, depends in a quadratic fashion on My. Sensitivity, as measured by the slope of this response curve increases monotonically with My until $My = Ms$. At saturation, the sensitivity drops to zero.

The sketch of FIG. 1(d) shows that the excitation, originating from magnetic charges in the medium 11, is largest at the lower edge of the MR sensor 10. On moving up on the sensor stripe, the flux leaks to the adjacent shields 12, and excitation decreases. As shown in FIG. 1(e) typically, the excitation is not a "small signal input" but, at least at the lower stripe edge, causes excursions over a substantial portion of the sensor's operating range. The excitation vanishes at the upper edge, h.

Considering the bias dependence of sensitivity, and, the profile of excitation, it follows that maximum sensitivity is obtained by locally biasing the sensor to the largest skew permissible without the combined bias and excitation producing saturation. The plot in FIG. 1(f) shows the bias profile for maximum output signal. Bias skew increases in accord with the decreasing excitation. With such a bias profile, the excursions of transverse magnetization across the stripe, remain just short of saturation as is shown in FIG. 1(g).

FIG. 2 illustrates relationships helpful in understanding the desired longitudinal bias profile. The longitudinal bias must be strong enough to retain the sensor in a single domain state, as is required for the suppression of Barkhausen noise. However, the stronger the longitudinal bias, Hx, the lower the sensitivity of the MR sensor. Typically, the applied longitudinal bias field, Ha, is uniform, as indicated in FIG. 2(a), so that the effective bias field, He, being the sum of the applied and the demagnetizing field, Hd, peaks about the center of the sensor. The resulting concave sensitivity profile, S, is undesirable since the magnetic head would have a sensitivity that is lowest over the center of the track and highest about the edges of the track. A more advantageous convex sensitivity profile, FIG. 2(b), is attainable with a bias field that increases in strength toward the ends of the sensor. Such bias renders the sensor single domain, while leaving its center segment at maximum sensitivity. This is the sensitivity profile that is provided by the present invention.

Figure 3:
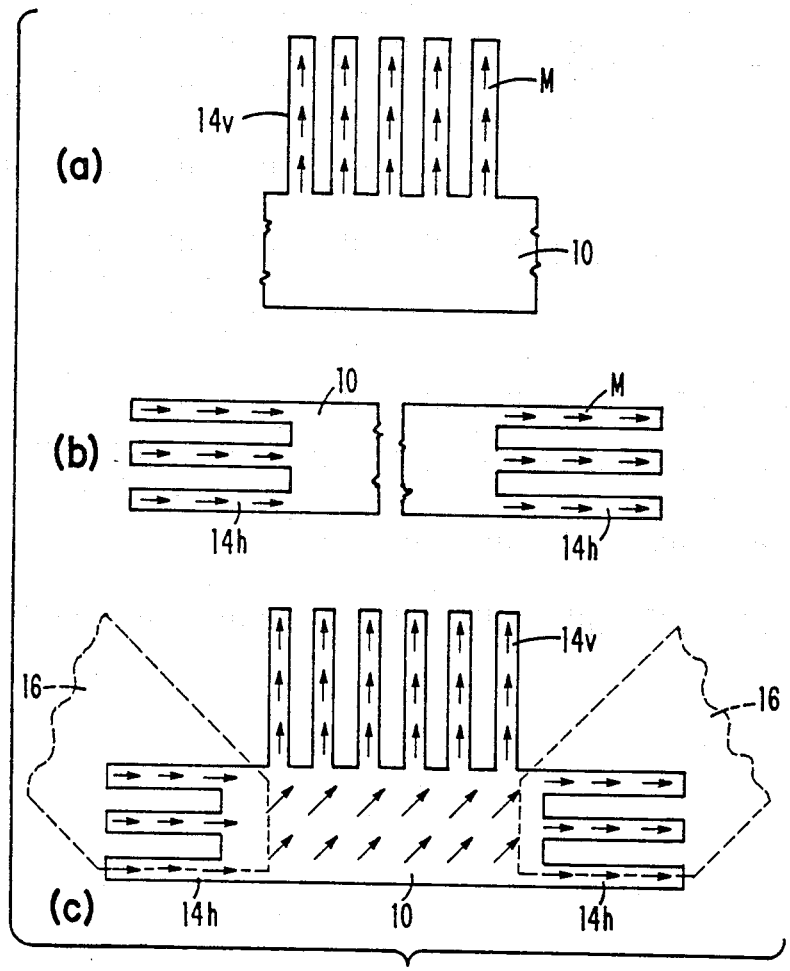
FIGS. 3(a)-(c) show plan views of different sensor geometries.

The present invention includes the addition of elongated or "comb" attachments 14 to the MR sensor 10 as is shown in FIG. 3. An elongated vertical comb attachment 14v, as shown in FIG. 3(a), provides transverse bias while the elongated horizontal attachment or comb 14h of FIG. 3(b) provides longitudinal bias. Both bias components are obtained from a configuration like the one shown in FIG. 3(c) in which both horizontal combs 14h and vertical combs 14v are provided on the same MR sensor 10. The combs 14 are contiguous with and made of the same material as the MR sensor element 10.

It was found that these comb extensions 14h, 14v, when magnetized along their long axis, exert a magnetostatic bias on the MR sensor much like each extension was a permanent magnet. The extensions do, in fact, behave much like permanent magnets in that they exhibit a large hysteresis to magnetization reversal. This hysteresis can easily be ten times larger than the intrinsic coercive force of the sensor material. As the extensions 14 are made of a soft-magnetic material, typically Permalloy, such hysteresis may be surprising but is explainable considering their geometry. The long, narrow, extensions have a large shape anisotropy which imposes a substantial magnetostatic energy barrier to magnetization reversal.

Figure 4:
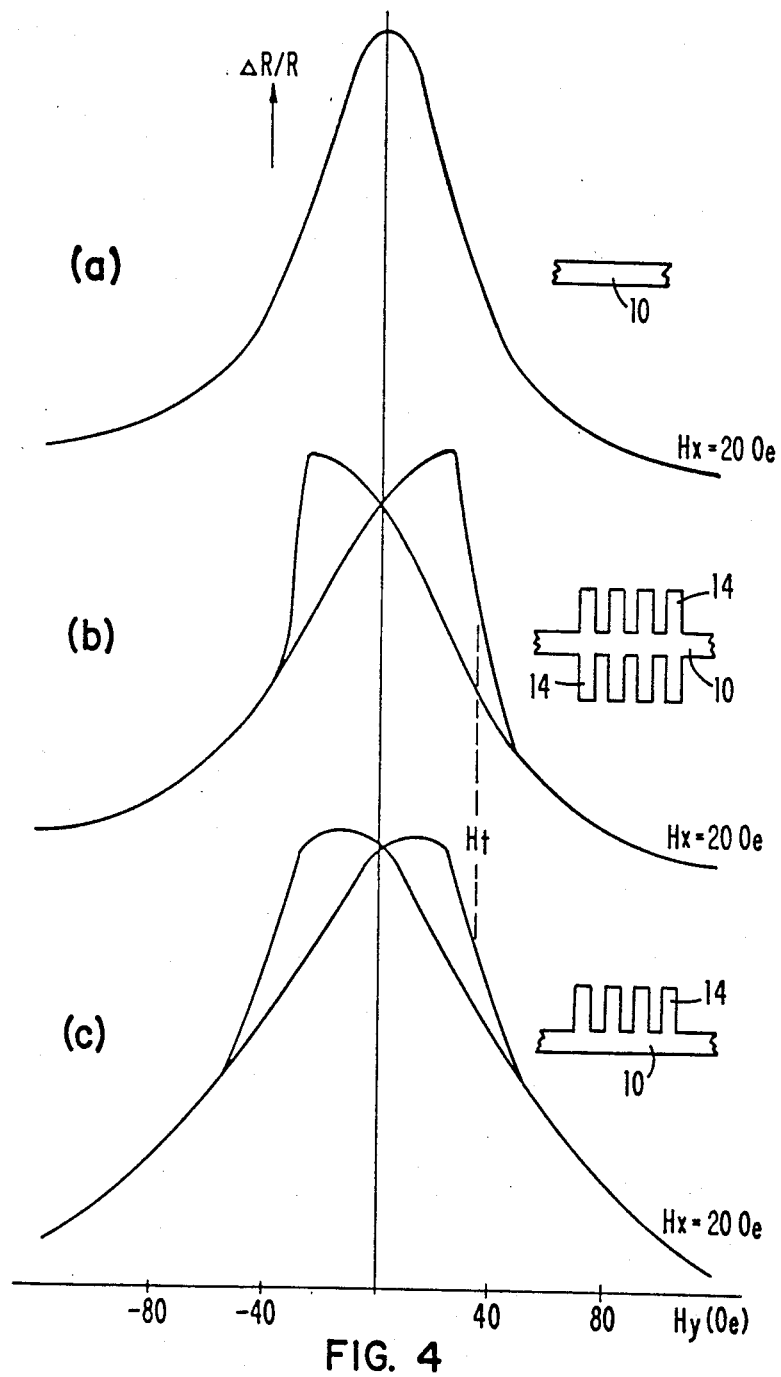
FIGS. 4(a)-(c) show the effects of different sensor configurations on the sensor operating characteristics.

FIG. 4 shows the effects of transverse extensions. These MR characteristic curves were measured versus a varying transverse field, Hy, plus a constant longitudinal field, Hx, to retain a single domain magnetization. The three curves show plots of $\Delta R/R$ vs Hx for different sensor geometries. Curve (a) shows the response of a 25 μm wide stripe without extensions (as a reference). Curve (b) shows the response of transverse extensions on both sides of the MR stripe, and curve (c) shows the response of transverse extensions only on one side of the stripe. It can be observed from curves (b) and (c) that the sensor is put into either a positive or a negative state of internal transverse bias, depending on whether the applied field is reduced to zero from positive or from negative saturation. The sensor remains in that state until, at some threshold, Ht, of reversed field, the bias state reverses. The curves demonstrate that a transverse bias condition producing a linear response characteristic can be obtained simply by means of the transverse attachments to the sensor geometry. Test data on specific embodiments of the comb MR structure has shown that this structure is capable of providing a self-sufficient bias. The question of whether the bias is self-sufficient involves two issues, bias permeance and the level of bias than can be achieved.

Figure 6:
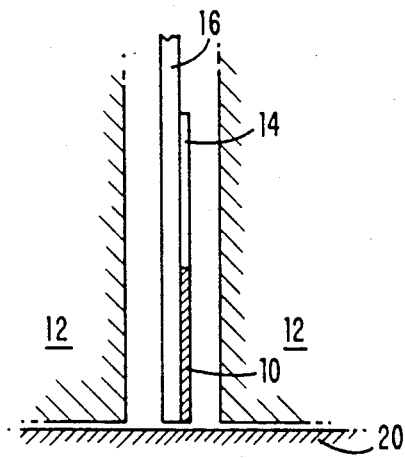
FIG. 6 shows a cross section view of a specific embodiment of an MR sensor according to the present invention.

Bias permeance requires the reversal threshold Ht to be larger than any disturbing fields seen by the comb structure. The disturb fields may be environmental or originate from the storage medium. Whatever their external value, the strength of such fields will be much reduced at the comb location, at least within the usual MR configuration employing magnetic shields as shown in FIG. 6. The amplitude of this residual disturb field has to be compared to the reversal threshold for Ht. Typically, Ht is in the tens of Oe. For example, one specific embodiment similar to FIG. 4 has 2.4 μm wide extensions and a reversal threshold of about 30 Oe. Narrower extensions, 1.4 μm wide, have a reversal threshold of about 5 Oe. Although these values appear safe relative to the expected amplitudes of disturb fields, there remains the concern that repetitive disturb cycles may degrade the bias condition in some fashion. Testing was done regarding the possibility of such an occurrence, and no degradation of bias was found after 30,000 disturb cycles, even with disturb amplitudes just below Ht.

Bias sufficiently too, depends on comb geometry. As is suggested in FIG. 3, the magnetization, M, is roughly perpendicular to the MR sensor where the comb extension meets the sensor. Between extensions, M tends to be parallel to the MR sensor. Along the sensor's upper edge, the average skew angle is determined by the width to spacing ratio of the extensions. On moving downward from the upper edge, the biasing flux from the comb extensions leaks to the adjacent shields. This results in the familiar hyperbolic decay of the transverse bias condition, the same as the decay of the excitation coming from the lower edge, just in the opposite direction. The measured response characteristics reflect, of course, this bias averaged over the height of the MR stripe. Such measurements show that the average bias increases with the width to spacing ratio of the comb extensions, and decreases with the height of the MR stripe. One specific embodiment having a geometry similar to FIG. 4, having a nominal width/spacing ratio of 1.7 and a 4 μm high MR stripe, exhibits an average internal bias of 15 Oe for the one-sided configuration FIG. 4(c) and 30 Oe for the two-sided configuration FIG. 4(b). Corresponding quiescent skew angles are 14 deg. and 28 deg. respectively, based on a measured shape anisotropy of 64 Oe.

The degree of bias permeance and sufficiency is hence dictated by geometry and limited by resolution of the fabrication process. Bias permeance improves with a decreasing width of the extensions, while bias sufficiently improves with an increasing width/spacing ratio. These competing requirements can both be satisfied only by having small spacings between extensions.

In a specific embodiment, the MR sensor has a geometry such as that shown in FIG. 3(c), and a section view of this sensor is shown in FIG. 6. In this embodiment a plurality of horizontal combs 14h and a plurality of vertical combs (not shown in FIG. 6) are provided on the same MR sensor 10, and electrical conductor leads 16 (shown in dashed line in FIG. 3(c)) are provided to conduct the read signal to the external read circuits (not shown). The MR sensor 10 is positioned to face the magnetic recording medium 20 and is preferably flanked by soft-magnetic shields 12, but in some cases the shields can be omitted. In the specific embodiment, the MR sensor was fabricated having the geometry of FIG. 3(c) and FIG. 6 and having the following dimensions, and this sensor had suitable performance characteristics. The sensor has an MR stripe height of 3 μm, and comb extensions that are 50 μm long, and 2.5 μm, wide with a spacing between comb extensions of 1 μm. By evaluating embodiments having varied values in the relevant geometric parameters, it was concluded that the length to width ratio of the comb extensions should be at least 10, and that the ratio of the width of the comb extensions to their spacing should be at least two.

Figure 5:
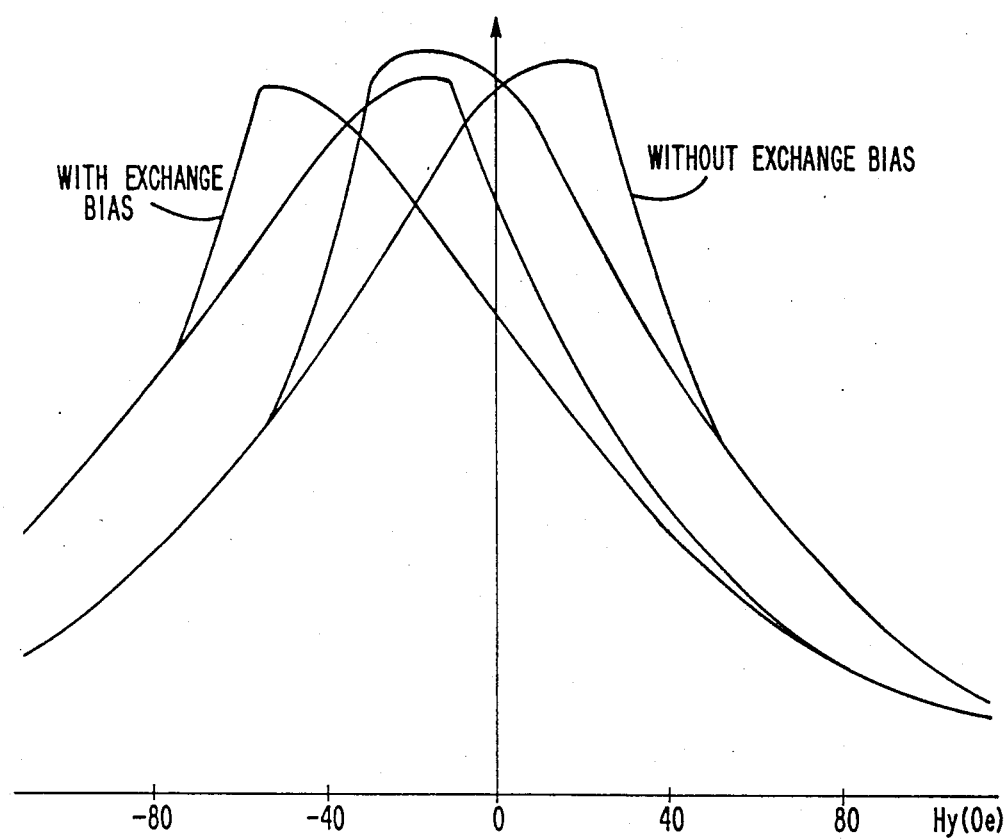
FIG. 5 shows a comparison of the sensor operating characteristics of a specific embodiment alone and with exchange bias.
Figure 7:
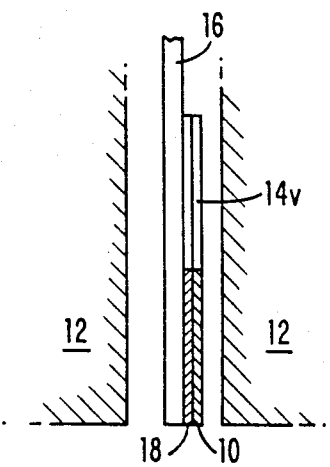
FIG. 7 shows a cross section view of an alternate embodiment of an MR sensor according to the present invention.

The comb configuration need not necessarily be used as a self-sufficient bias method. It can also, at no expense, be used to improve upon some other bias provisions. There is no reason, in principle, why the comb configuration cannot be used to enhance any of the bias techniques discussed in the Prior Art section of this application. For example, it may be used in combination with exchange bias. In this case (see FIG. 7), the sensor consists of a sandwiched MR sensor 10 and exchange bias film 18, both patterned together to the same geometry such as that shown in FIG. 3(a), for example, FIG. 5 compares response characteristics of two identical comb configurations, one with and one without exchange bias. Without exchange bias, as shown in curve (a), we have the familiar transverse response, indicating an average, comb-induced bias field of 15 Oe. With exchange bias, which, in effect, acts just like a superpositioned DC magnetic field, the loop is offset relative to Hy. The amount of offset equals the transverse component of exchange bias. Since the direction of exchange bias is adjustable, one can adjust relative bias components in the transverse and the longitudinal direction. In the present example, the bias direction was set at 85 deg. from the x-axis. The curve shows a resulting transverse bias of 32 Oe and one would hence estimate a 3 Oe longitudinal component.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetic transducer comprising a magnetoresistive element for reading magnetically recorded information from a magnetic medium characterized in that said magnetoresistive element comprises an elongated member formed of a magnetic material having a predetermined height measured in a direction normal to the magnetic medium from a first edge of said magnetoresistive element which is adapted to face the recording medium and a plurality of elongated attachments contiguous with and of the same material as said magnetoresistive element, said elongated attachments having a predetermined width, a length substantially greater than said width, a predetermined spacing between adjacent ones of said elongated attachments, and being unidirectionally magnetized along their length so that a bias is produced to obtain a substantially linear component in magnetoresistive response in said magnetoresistive element so that previously recorded information is read from said medium with optimum sensitivity and so that Barkhausen noise is suppressed.

2. The magnetic transducer according to claim 1 wherein said elongated attachments include at least one attachment which extends along its length in a direction substantially parallel to said first edge and at least one other attachment which extends in a direction substantially normal to said first edge.

3. The magnetic transducer according to claim 2 wherein said at least one other elongated attachment which extends along its length in a direction substantially normal to said first edge is along a second edge of said magnetoresistive element which is adapted to face away from said first edge.

4. The magnetic transducer according to claim 1 wherein said elongated attachments have a length that is at least ten times as the width of said elongated attachments.

5. The magnetic transducer according to claim 1 wherein said elongated attachments have a width which is at least twice the spacing between adjacent ones of said elongated attachments.

6. The magnetic transducer according to claim 1 additionally comprising an additional source of bias to said magnetoresistive element other than the bias provided by said elongated attachments.

7. The magnetic transducer according to claim 6 additionally comprising an exchange bias film sandwiched with said magnetoresistive element, said exchange bias film having the same geometry as said magnetoresistive element.

* * * * *